No. 11,794. Reissued Dec. 12, 1899.

J. E. SAYLES & H. E. REEVE.

ELECTRIC SWITCH.

(Application filed Oct. 10, 1899.)

2 Sheets—Sheet 1.

Witnesses:

Jas. F. Bleman

Jno. R. Taylor

Inventors

John E. Sayles and

Henry E. Reeve by Alex. Bannerman & Son

Att'ys.

No. 11,794. Reissued Dec. 12, 1899.
J. E. SAYLES & H. E. REEVE.
ELECTRIC SWITCH.
(Application filed Oct. 10, 1899.)
2 Sheets—Sheet 2.
Fig. 3
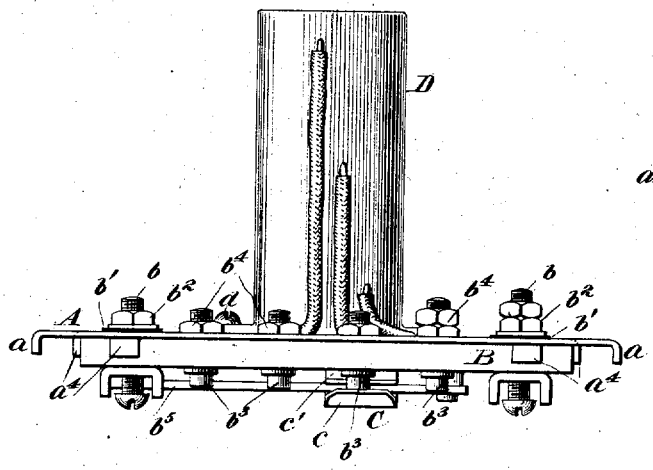
Fig. 5
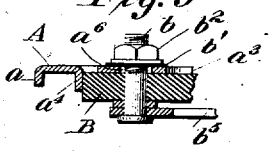
Fig. 4
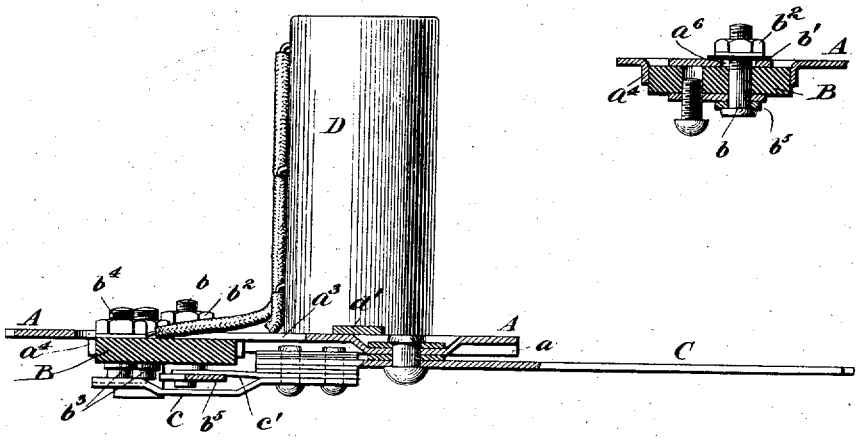
Fig. 6
Witnesses:
Jas. T. Kenan
Jno. R. Taylor
Inventors
John E. Sayles and
Henry E. Reeve
by Ayer, Lawrence & Fox
Att'ys.

UNITED STATES PATENT OFFICE.

JOHN E. SAYLES, OF MONTCLAIR, NEW JERSEY, AND HENRY E. REEVE, OF NEW YORK, N. Y.

ELECTRIC SWITCH.

SPECIFICATION forming part of Reissued Letters Patent No. 11,794, dated December 12, 1899.

Original No. 630,076, dated August 1, 1899. Application for reissue filed October 10, 1899. Serial No. 733,233.

*To all whom it may concern:*

Be it known that we, JOHN E. SAYLES, residing in Montclair, in the county of Essex and State of New Jersey, and HENRY E. REEVE, residing in New York, in the borough of Brooklyn, and State of New York, citizens of the United States, have invented certain new and useful Improvements in Electric Switches, of which the following is a specification, reference being had to the accompanying drawings, forming a part hereof.

This invention relates to current-controlling devices, such as are commonly employed in many different forms of electrical apparatus, and more especially to those in which a number of contacts are required; and it has for its object to produce a light and well-ventilated switching device which shall be of very low cost of manufacture and yet thoroughly efficient, reliable, and durable.

The invention is illustrated in the accompanying drawings as embodied in a resistance device; but it will be understood that it is equally capable of application to other devices and for other purposes.

Figure 1:
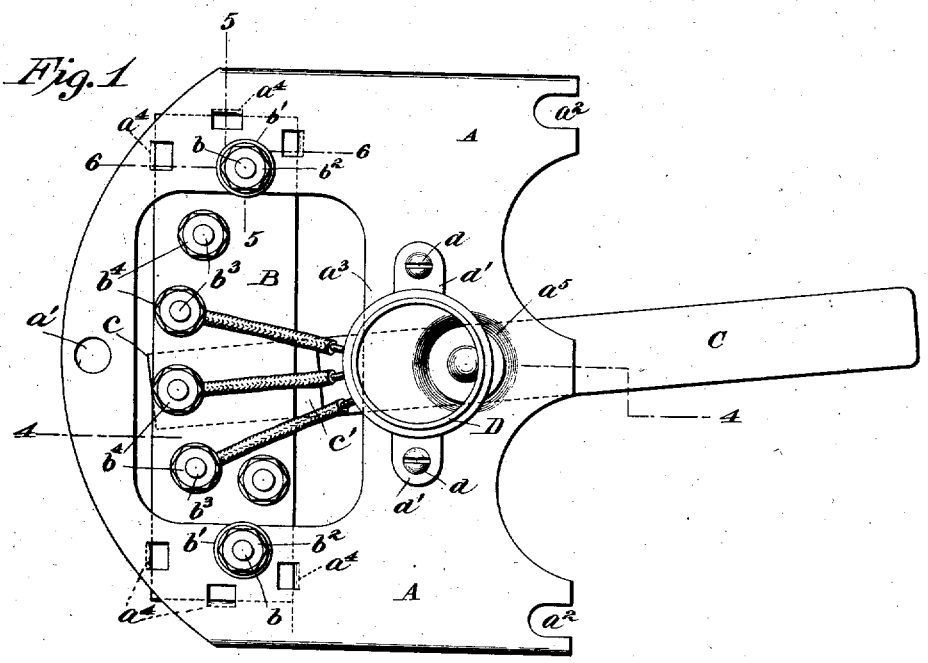
Figure 2:
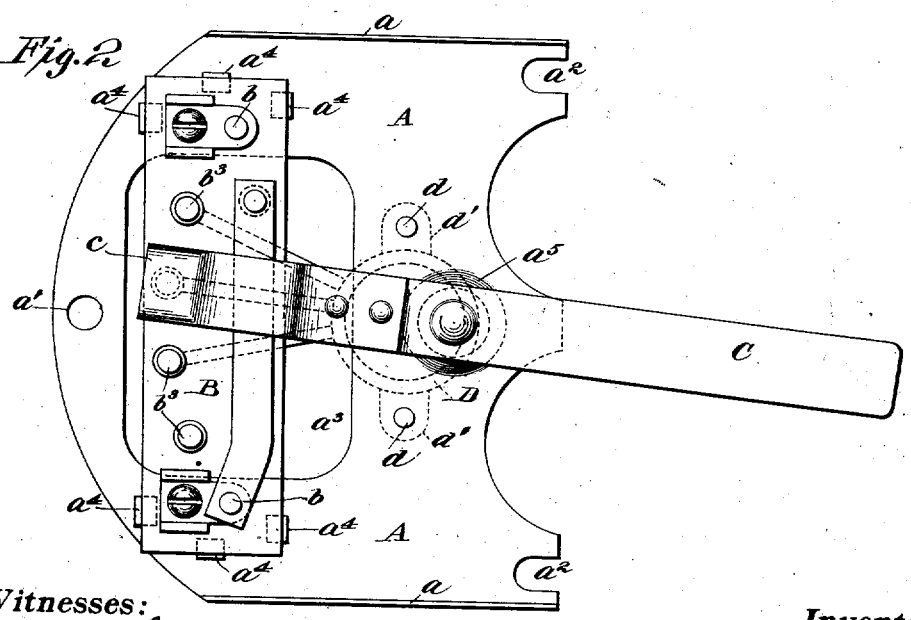

In said drawings, Figure 1 is a plan view of such a resistance device to which the invention is applied. Fig. 2 is an under side view of the same. Fig. 3 is a front elevation thereof. Fig. 4 is a vertical section on the irregular plane indicated by the line 4 4 of Fig. 1. Figs. 5 and 6 are detail views in section on the planes indicated by the lines 5 5 and 6 6, respectively, of Fig. 1.

The invention is concerned mainly with the base A, which has heretofore been made usually of cast metal, thereby entailing considerable expense not only in the making of the base, but in the finishing and fitting thereof, but in the present case is made of sheet metal and can therefore be stamped up at one operation and therefore produced at a minimum of expense. Flanges $a$ $a$ are formed on the base to give stiffness, and holes or notches $a'$ $a^2$ may be provided for convenience in the attachment of the device to its foundation. In the central portion of the base-plate A is an opening $a^3$, which affords sufficient room for the contacts carried by the insulating-block B and permits the free circulation of air. For the purpose of determining the exact position of the insulating-block B and of centering it, so that the parts can be assembled with the least labor, lugs $a^4$ are struck up from the base-plate A to receive between them the ends of the insulating-block. A boss $a^5$ is also struck up from the plate to form a suitable bearing upon which the switch-lever C can be pivoted, the boss leaving the necessary clearance between the lever and the plate to be secured readily.

As the insulating-block B is centered and held from lateral displacement by the lugs $a^4$, above referred to, it becomes possible to dispense with additional screws or other devices for securing the block to the base or plate and to rely for that purpose upon the binding-posts $b$ $b$, which pass through holes $a^6$ of larger diameter in the plate A and are insulated therefrom by washers $b'$ in the usual manner. Nuts $b^2$ may be employed, as usual, to secure the binding-posts in position. Other contacts $b^3$ may be carried upon the insulating-block B, as usual, being represented as secured by nuts $b^4$. The switch C is represented as having one tongue $c$ for contact with the contacts $b^3$, and another tongue $c'$ for contact with a bar $b^5$, which is likewise secured to the block B and is included in the electric circuit. By engaging the tongue $c'$ with the bar $b^5$ the tongue $c$ will be kept always in good contact with the contacts $b^3$, irrespective of any warping or buckling of the insulating-block B or of any looseness at the pivot for the switch-lever C.

An ordinary resistance-tube D is represented as mounted upon the base-plate A, being secured in position thereon by suitable fastenings $d$, which engage flanges $d'$ of the tube. The several contacts $b^3$ are represented as connected as usual to the resistance-tube at different points. The mode of use of the particular structure shown and described herein for the purpose of throwing more or less resistance into a circuit will be readily understood without further explanation herein. It will also be evident that the improved switch, whether designed for the particular purpose herein referred to or for some other purpose, can be produced at very small expense, especially by reason of the fact that the base-plate A can be formed ready for use with a minimum of labor and that the assembling of the parts can be effected with the least possible amount of labor. Moreover, although the device is of very little weight and is of such open construction as to permit the proper circulation of air about all of its parts it is nevertheless rigid and strong.

We claim as our invention—

1. An electric switch comprising a sheet-metal base having stiffening-flanges and retaining-lugs struck up therefrom, an insulating-block secured to said base and centered between said lugs, said block having contacts thereon, and a switch-lever pivoted upon said base, substantially as shown and described.

2. An electric switch comprising a sheet-metal base having retaining-lugs struck up therefrom and holes formed therein, an insulating-block having contacts thereon, binding-posts mounted on said block and passing through the holes in said base, said holes being of larger diameter than said binding-posts, whereby said binding-posts serve as electric conductors and also to secure said block to said base, and a switch-lever pivoted upon said base, substantially as shown and described.

3. In an electric switch, the combination with an insulating-block having contacts thereon, and a bar carried by said block and disposed in the same general direction as said contacts, of a pivoted switch-lever having two tongues, one of which engages the contacts and the other of which engages said bar to hold the first-mentioned tongue in contact with said contacts, substantially as set forth.

This specification signed and witnessed this 26th day of September, 1899.

JOHN E. SAYLES.
HENRY E. REEVE.

In presence of—
JNO. R. TAYLOR,
FRANK L. DYER.